(12) United States Patent
Mallapragada et al.

(10) Patent No.: US 7,217,776 B1
(45) Date of Patent: *May 15, 2007

(54) PH-SENSITIVE METHACRYLIC COPOLYMER GELS AND THE PRODUCTION THEREOF

(75) Inventors: Surya K. Mallapragada, Ames, IA (US); Brian C. Anderson, Lake Bluff, IA (US)

(73) Assignee: Iowa State University Research Foundation, Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/366,864

(22) Filed: Feb. 14, 2003

(51) Int. Cl.
*C08F 116/16* (2006.01)

(52) U.S. Cl. ............ 526/333; 526/277; 526/279; 526/310; 526/317.1; 526/328.5; 526/332

(58) Field of Classification Search ........... 526/310, 526/328.5, 332, 333, 277, 279, 317.1
See application file for complete search history.

(56) References Cited

FOREIGN PATENT DOCUMENTS

WO    WO 02/100439 A1 * 12/2002

OTHER PUBLICATIONS

Lee et al. Macromolecules, 35(22), 8540-8551, 2002.*
Deshpande et al. J. Controlled Release, 81(1-2), 185-199, 2002.*
Even et al. Polymeric Materials Science and Engineering, 84, 955-956, 2001.*
Varnvakaki et al. Macromolecules, 32(6), 2088-2090, 1999.*
Anderson et al. Mat. Res. Soc. Symp. Proc., 662, NNi.8/1-NN1.8/6, 2001.*

* cited by examiner

*Primary Examiner*—Helen L. Pezzuto
(74) *Attorney, Agent, or Firm*—Quarles & Brady LLP

(57) ABSTRACT

The present invention provides novel gel forming methacrylic blocking copolymers that exhibit cationic pH-sensitive behavior as well as good water solubility. The copolymers are constructed by polymerization of a tertiary amine methacrylate with either a (poly(ethylene oxide)-b-poly(propylene oxide)-b-poly(ethylene oxide) polymer, such as the commercially available Pluronic® polymers, or a poly(ethylene glycol)methyl ether polymer. The polymers may be used for drug and gene delivery, protein separation, as structural supplements, and more.

30 Claims, 11 Drawing Sheets

PH-SENSITIVE METHACRYLIC COPOLYMER GELS AND THE PRODUCTION THEREOF

STATEMENT REGARDING FEDERALLY SPONSORED RESEARCH OR DEVELOPMENT

The present invention was developed using financial support provided by the U.S. Department of Energy under contract number W-7405-ENG-82. The United States Government has certain rights in the present invention.

CROSS-REFERENCE TO RELATED APPLICATIONS

None.

BACKGROUND OF THE INVENTION

The present invention relates generally to copolymers useful in applications such as drug delivery, protein separation, and gene delivery vectors. The copolymers are water soluble, pH-sensitive and capable of thermoreversible gelation.

One beneficial characteristic that polymeric materials have added to the field of drug delivery is their ability to respond to their environment. By modifying the chemical composition of either the backbone or pendant groups, polymers can respond to a wide range of stimuli. One stimulus more often exploited for drug delivery purposes is pH dependence. This dependence can be expressed by polymers having either anionic or cationic characteristics. Polymers with cationic functionality will tend to swell in low pH aqueous solutions whereas polymers with anionic functionality tend to swell in high pH solutions.

Cross linked cationic polymer membranes of diethylaminoethyl methacrylate (DEAEM) and dimethylaminoethyl methacrylate (DMAEM) have been previously synthesized for drug delivery applications. (See G. Albin et al., *J. Controlled Rel.*, 2:153 (1985); J. Kost et al., *J. Biomed. Mater. Res.*, 19:1117 (1985); K. Ishihara et al., *Polymer J.*, 16(8):625 (1984); D. Hariharan and N. A. Peppas, *Polymer.*, 37(1):149 (1996); and L. M. Schwarte and N. A. Peppas, *Polymer.*, 39(24)L6057 (1998).) In these cases, the polymers have been rendered glucose sensitive by the attachment of glucose oxidase, thus providing a possible vehicle for insulin release. One main disadvantage of these materials, however, is that they are not water-soluble and, if implanted, remain in the body long after the useful life of the delivery device.

Other research efforts have focused on graft and block copolymers comprised of domains with anionic functionality and separate water-soluble portions, such as poly(ethylene glycol) (PEG). (See A. S. Hoffman et al., *Polym. Prepr.*, 38(1):524 (1997); L. Bromberg, *Ind. Eng. Chem. Res.*, 37:4267 (1998); and L. Bromberg, *J. Phys. Chem.*, 102:1956 (1998).) These polymers have been primarily used for the release of drugs in the intestines, where a rise in pH would indicate that the device had passed through the stomach and is no longer in the harsh acidic conditions. Once in the intestines, where the pH is higher, the delivery polymer then becomes water-soluble and the polymer-bound drug may be released.

Nagasaki et al. also reported the production of various methacrylic block polymers with possible use in drug delivery applications. (Nagasaki et al., *Macromol. Rapid. Commun.*, 18:827 (1997).) These block polymers are prepared by polymerizing a methacrylic ester monomer, having an electron-donating substituent group bonded to a specific site of its ester residue, using a potassium alcoholate. Under this polymerization system, if a cyclic ether (e.g., ethylene oxide) or a cyclic ester (e.g., a lactide or lactone) is reacted with the methacrylic ester monomer, a living polymer chain could be produced with the methacrylic ester extending through the medium of the living polymer chain. If the cyclic ether or cyclic ester is allowed to coexist in the reaction system, the monomer may also readily undergo co-polymerization to yield a block copolymer of a methacrylic ester possessing both a functional group at the ester sides and a lactide or lactone.

Other polymers, such as polyethyleneimine, have been used as vehicles to induce flocculation of proteins and other biomacromolecules. (See Mortimer, D. A., *Polymer Inter.*, 25:29 (1991); and Chen et al., *Chem. Eng. Sci.*, 47:1039 (1992).) In these polymers, the electrostatic interaction between the biomolecule and the selected polyelectrolyte provides the means to selectively precipitate charged molecules out of an aqueous solution, such as a fermentation broth.

The newest use for cationic polymers is the delivery of genetic material to mammalian cells for gene therapy applications. Recently van de Wetering et al. outlined the use of tertiary amine methacrylate homopolymers for gene delivery and the effect that the type of methacrylate has on the transfection efficiency. (See van de Wettering et al., *J. Controlled Release*, 64:193 (2000).) It was found in this study that a homopolymer of 2-(diethylamino)ethyl methacrylate (DEAEM) might be a useful delivery material for plasmid DNA. However, it was also found that DEAEM could not form polymer/DNA complexes like many other cationic methacrylates, presumably because of the low water solubility of the polymer.

Rungsardthong et al., also recently reported the use of copolymers for gene delivery applications. (Rungsardthong et al., *J. Controlled Release*, 73:359–380 (2001).) In this study copolymers of DMAEMA with poly(ethylene)glycol (PEG) were investigated for their ability to serve as vectors in gene therapy. In vitro transfection experiments in this study showed that the DMAEMA homopolymer gave the highest level of transfection as compared to the control poly-L-lysine (PLL) system. The PEG:DMAEMA copolymer gave reduced levels of transfection, believed to be due to the steric stabilization effect of the PEG corona.

One area which has not yet been fully exploited is the use of pH-dependent functionalities in non-crosslinked injectable systems. Such systems would have advantages over crosslinked systems as they can be simply injected into the body to form a solid non-crosslinked gel that will eventually dissolve and be excreted.

Crosslinked hydrogels incorporating characteristics of pH and/or temperature sensitivity for stimuli-sensitive release of pharmaceutical drugs have only recently been developed. (See Lowman et al., *J. Pharm. Sci.*, 88:933 (1999); and Brazel, C. S., and Peppas, N. A., Macromolecules, 28:8016 (1995).) For example, the triblock copolymer Pluronic® (poly(ethylene oxide)-b-poly(propylene oxide)-b-poly(ethylene oxide)) has distinct amphiphilic properties and the ability to form non-crosslinked gels. Under the appropriate concentration and thermal conditions, aqueous solutions having this polymer will form micellar systems consisting of dehydrated poly(propylene oxide) cores surrounded by solvated poly(ethylene oxide) coronas. The segregated lipophilic nanophase of this compound can also increase the total aqueous solution solubility of small organic molecules like naphthalene and ibuprofen, molecules that are relatively insoluble in non-micellar aqueous solutions. At sufficient polymer concentrations, the Pluronic polymer will also undergo a sol-gel transition at temperatures slightly higher than its critical micellization temperature (CMT). When water penetrates the gel, lowering the total concentration of the polymer at the gel interface below a concentration sufficient to maintain the gel state at that temperature, the gel will dissolve to cause a controlled release of the associated pharmaceutical drug.

However, the Pluronic® polymers are not sensitive to pH and typical in vitro dissolution times have been on the order of 5–6 hours. (See Chi, S. C., and Jun, H. W. *J. Pharm. Sci.*, 80:280 (1991); and Anderson et al., *Journal of Controlled Release*, 70:157 (2001).) Although in vivo release times are slightly longer, on the order of 10–20 hours, the Pluronic polymers on their own may not be extremely useful for controlled drug or bioactive molecule delivery. In particular, to compete with the commercially available orally administered controlled released tablets, injectable devices must release their dosage over a time period much longer than that available with the present Pluronic® system.

BRIEF SUMMARY OF THE INVENTION

The present invention provides a group of novel block copolymer compounds that are water soluble, pH-sensitive and capable of thermoreversible gelation. The block copolymers are described in detail below and are synthesized by polymerization of a tertiary amine methacrylate with either a polyethylene glycol methyl ether (PEGME), or a poly (ethylene oxide)-b-poly (propylene oxide)-b-poly(ethylene oxide) (Pluronic®), including low molecular weight or high molecular weight varieties of said compounds.

The copolymers exhibit cationic pH-sensitive behavior and good water solubility. The copolymers include a hydrophilic and a hydrophobic segment and are able to form polymer micelles having a core derived from the hydrophobic parts and a shell from the hydrophilic parts. Such polymer micelles can carry hydrophobic drugs and can complex with negatively charged compounds, such as nucleic acids, anionic proteins and other anionic drugs. As a result, the present copolymers may find several applications in drug delivery and protein separation, as well as use as gene vectors in gene transfer applications. Accordingly, the present invention further includes polymer micelles of the below-described copolymers, as well as pharmaceuticals and gene vectors utilizing said copolymers.

The present invention also includes a method for controlling the release of a pharmaceutical compound or gene vector, as well as structural compositions including the below-described copolymers. Under the appropriate concentration and thermal conditions, aqueous solutions including the present copolymers undergo a sol-gel transition to form non-crosslinked gels. The disclosed gels have shown to be non-cytotoxic and possessing of structural properties such that they may find use as injectable structural supplements for certain medical treatments and procedures. The gels also become soluble to an aqueous medium as they are penetrated by water, thus providing a pH-sensitive and dissolution and/or partially diffusion controlled-release drug delivery mechanism.

Other advantages and features of the present invention will become apparent after review of the specification, drawings, and claims.

DETAILED DESCRIPTION OF THE INVENTION

The present invention provides novel methacrylic block copolymers that exhibit cationic pH-sensitive behavior, good water solubility, and thermoreversible gelation characteristics. The novel compounds are represented by the following formula (I):

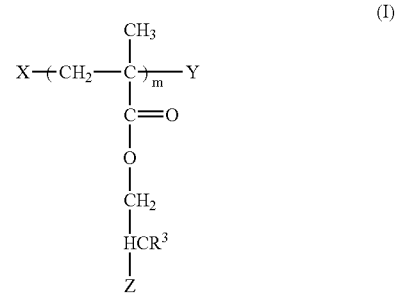

wherein X is represented by the formula:

in which n is an integer in the range of 30 to 20,000, or

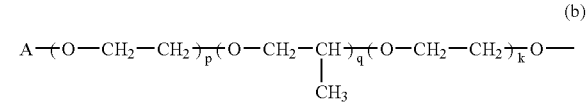

in which p is an integer in the range of 30 to 20,000, q is an integer in the range of 0 to 20,000, and k is an integer in the range of 0 to 20,000, and A is represented by the formula:

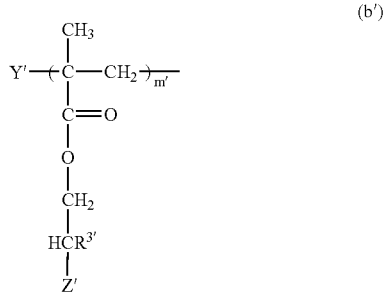

in which m' is a number in the range of 0 to 5,000;

Y is represented by the formula:

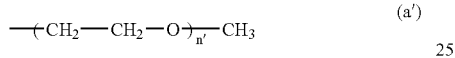

in which n' is in the range of 30 to 20,000, or if group X is (b), then Y is either represented by the formula (a'), formula (b), or a terminator group, and Y' is either represented by formula (a'), formula (b), or a terminator group;

m is a number in the range of 1 to 5,000.

$R^3$ and $R^{3'}$ are either a hydrogen or a $C_{1-6}$ alkyl group; and

Z and Z' are selected from the group of $NR^6R^7$, $P(OR^8)_3$, $SR^9$, SH,

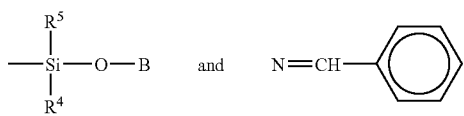

in which $R^6$, $R^7$, and $R^8$ are the same or different $C_{1-6}$ alkyl groups, $R^9$ is a tri($C_{1-6}$ alkyl)silyl group, and B is a $C_{1-6}$ alkyl group.

Figure 1A:
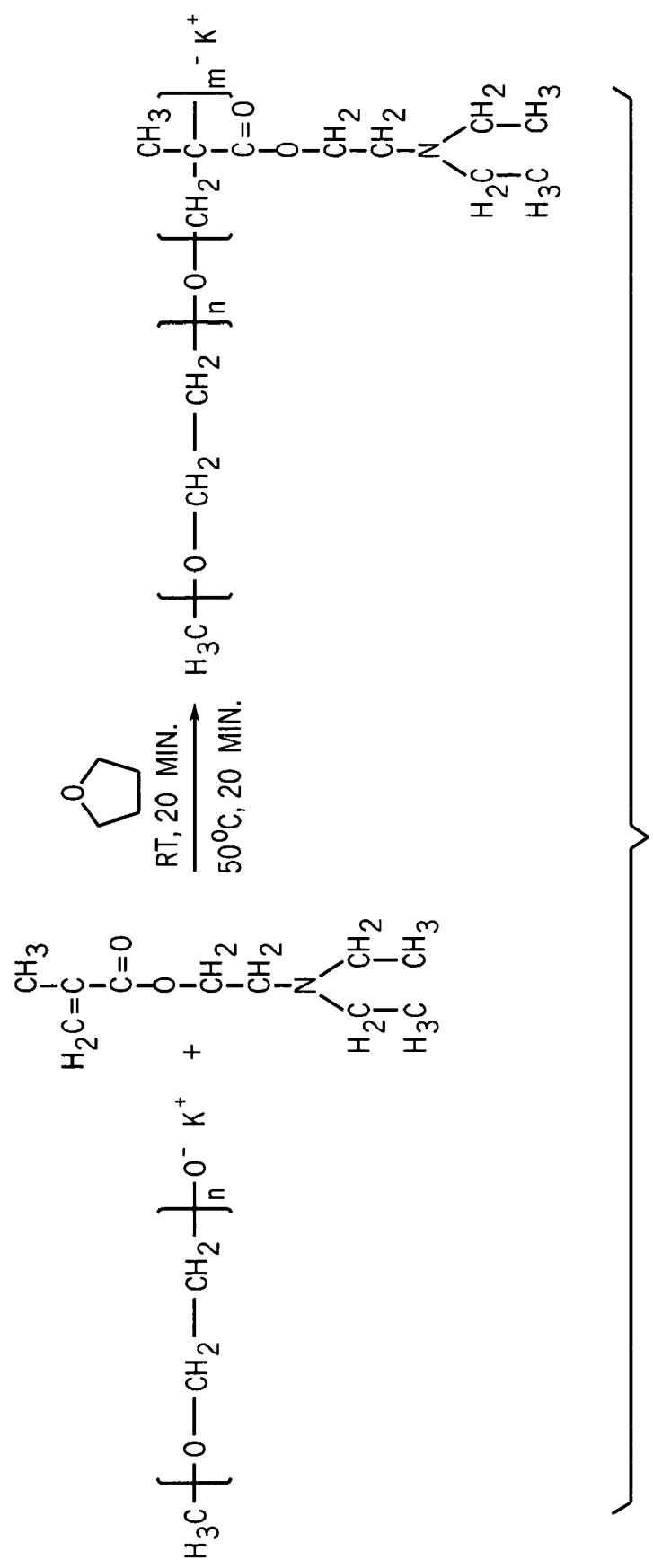
FIGS. 1A and 1B are an illustration of the reaction scheme for the triblock copolymer.
Figure 1B:
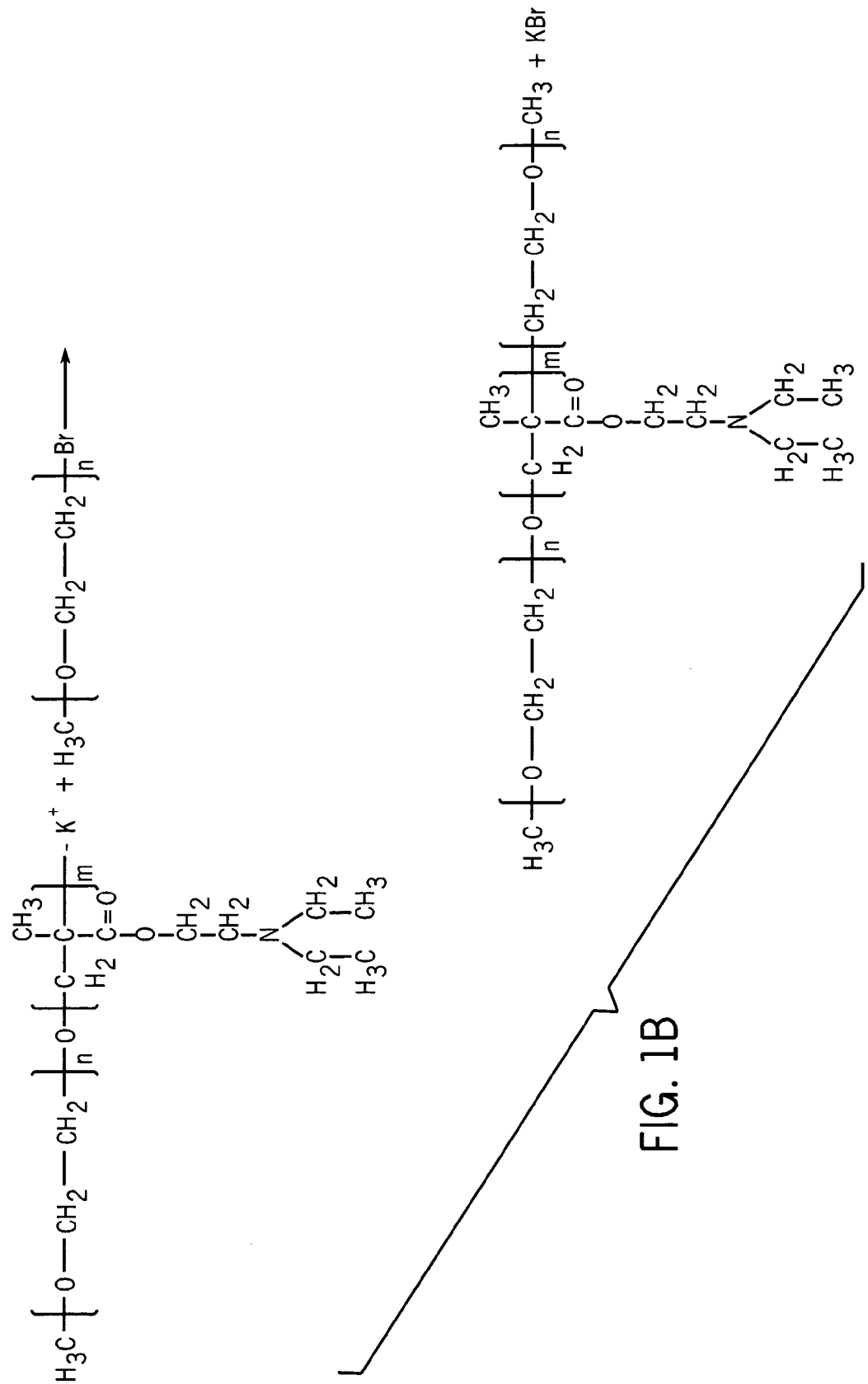
Figure 2A:
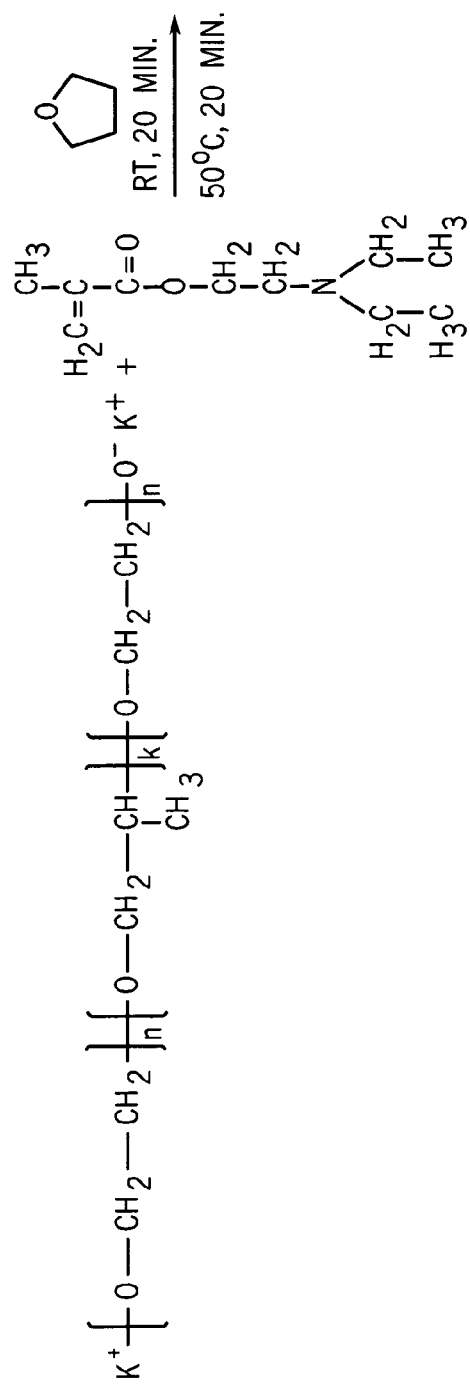
FIGS. 2A and 2B are an illustration of the reaction scheme for pentablock polymerization.
Figure 2A:
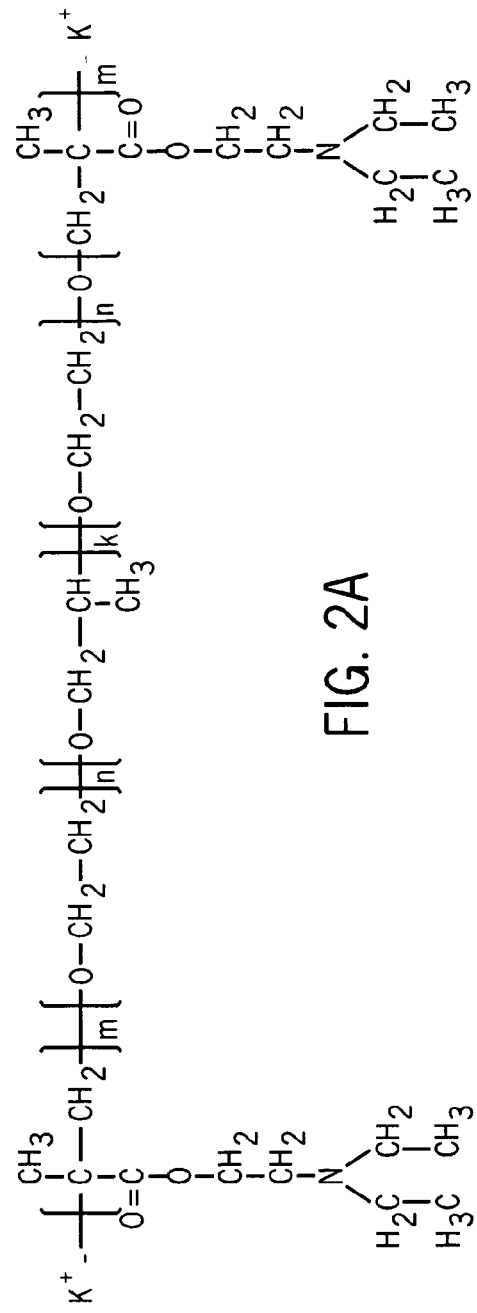
Figure 2B:
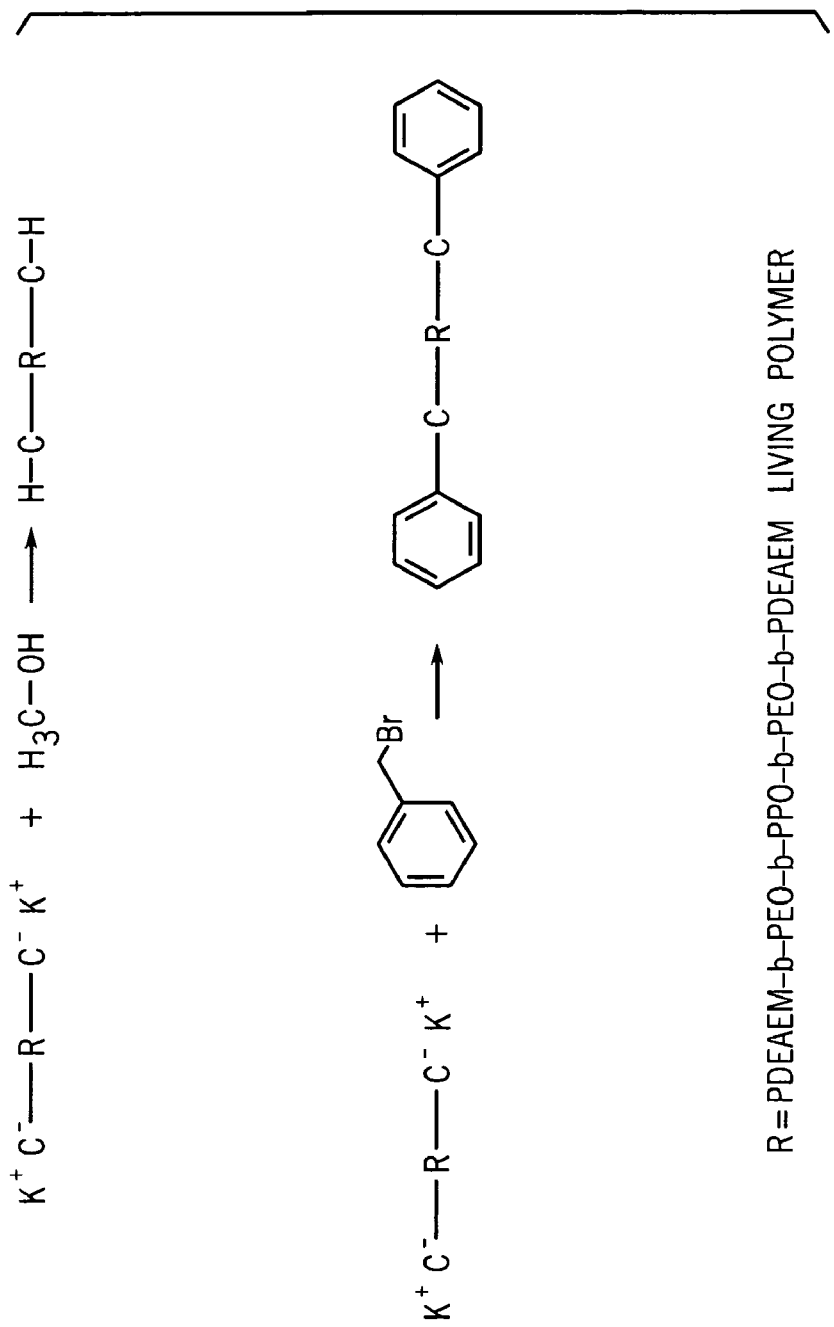

As illustrated in FIGS. 1 and 2, the copolymers may be synthesized by anionic polymerization of a tertiary amine methacrylate having the following formula (II):

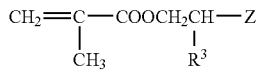

wherein $R^3$ and Z are as defined for formula (I). The tertiary amine methacrylate may also include low molecular weight or high molecular weight varieties of said compounds. Preferably $R^3$ is a hydrogen. In the most preferred embodiment, the tertiary amine methacrylate is 2-(N,N-diethylaminoethyl methacrylate).

The X group in formula (I) may be generally derived from a polyethylene glycol methyl ether, or a poly(ethylene oxide)-b-poly(propylene oxide)-b-poly(ethylene oxide), such as the commercially available Pluronic® triblock copolymer, or any low molecular weight or high molecular weight varieties of said compounds. The X group is preferably represented by either (a) or (b) of formula (I) above, and may be either substituted or unsubstituted.

The reaction for preparing the copolymers is generally set forth in FIGS. 1–4. The copolymers of the present invention are preferably synthesized using anionic polymerization, but may also be prepared using any technique that results in the synthesis of compounds having the above described formula (I). One such method is described by Nagasaki et al. in European Patent No. EP 0976767A1, which is incorporated herein by reference.

In the preferred embodiment, the copolymers of the present invention are prepared by first reacting a polymerization macroinitiator (based on either (a) or (b) of Group X in formula (I)) with a monomer. The reaction may be conducted according to any method known in the art, and will depend primarily on the compounds utilized. The combination of the macromolecule and an alkali metal provides a polymerization macroinitiator that can be represented by the following formula (III):

wherein Q is the monomer providing (a) or (b) of Group X, which initiates a living polymerization including either (a) or (b) of Group X, and M is an alkali metal, such as sodium or potassium. When Q is represented by (b) of Group X, the alkali metal M will also represent A of group (b) to allow polymerization to occur on both ends of group (b). This macroinitiator is then reacted with the tertiary amine methacrylate of formula (II) to provide living copolymers as illustrated in FIGS. 1 and 2.

Figure 4:
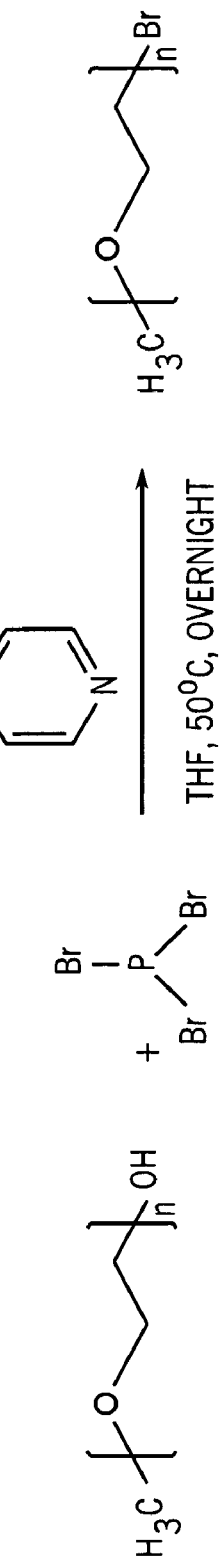
FIG. 4 is an illustration of the reaction scheme for the formation of one macroterminator which may be used in the triblock polymerization.

In the case where Group X is represented by (a), a macroterminator may be prepared to terminate the oxyanionic polymerization of the monomer providing (a') for Group Y. In the preferred embodiment, the macroterminator may be represented by the following formula (IV):

wherein Q' is the monomer providing (a') of Group Y, and M' is a bromide, as illustrated in FIG. 4. This brominated compound is then reacted with the living copolymer to provide a triblock copolymer as represented by formula (I), and as illustrated in FIG. 1.

In the case where Group X is represented by (b), the living copolymers are reacted after their construction with an appropriate compound to terminate further polymerization. Generally, when group X of formula (I) is (b), the termination will cause Y and/or Y' of formula (I) to be a terminator group. The terminator group may be either a reactive or nonreactive terminator group, and may be either protected or unprotected depending on the nature of the terminator employed and the intended use of the copolymer. Such terminator groups are well known in the art. Examples of such terminator groups include, without limitation, alkyl groups, carboxylic groups, COOH, $CH_2$—Ph, hydrogen, $CH_3$, or benzene.

The polymerization reaction may be carried out with or without the presence of an inert solvent, but preferably includes the use of an inert solvent. As used herein, the term "inert solvent" means any solvent that neither reacts with nor exerts an adverse influence on the polymerization reaction or the initiator and the formed polymer. Examples of such solvents include liquid solvents that do not react with alkali metal alcoholates under reaction conditions, including ether solvents, such as tetrahydrofuran, dioxane, diethyl ether and dimethoxyethane; aprotic solvents such as dimethyl sulfoxide, N,N-dimethylformamide, N,N-dimethylacetamide, and hexamethylphosphoric triamide; aliphatic hydrocarbons such as pentane, hexane and cyclohexane; and aromatic hydrocarbons such as benzene, toluene and xylene, with ethers such as tetrahydrofuran most preferred.

The amount of inert solvent employed, if any, will generally determine the speed at which the reaction will occur. In general, the reaction will be slower as the relative amount of the solvent increase. Therefore, the solvent is preferably used in an amount of 0.01 to 1,000 parts by volume of solvent to volume of monomer, and more preferably 0.5 to 100 parts by volume of solvent to volume of monomer.

The ratio of n and n' to m, and p, q and k to m and m', in formula (I) will be generally controlled by the molar ratio of Q and Q' of formula (III) and formula (IV) to the compound of formula (II). In general, Q may be used in a molar ratio of 0.0001 to 100 moles per mole of the formula (II) compound, and more preferably 0.0001 mole to 1 mole per mole of the formula (II) compound.

The copolymers of the present invention possess a variety of properties applicable to environment-sensitive drug or biomolecule release. In general, the present copolymers maintain the properties of thermoreversible gelation as well as thermally induced micellization in aqueous solutions, unique characteristics that have possible application to injectable drug delivery systems. Under the appropriate concentration and thermal conditions, aqueous solutions including the present copolymers will undergo a sol-gel transition to form non-crosslinked gels. The gels also become soluble to an aqueous medium as they are penetrated by water, thus providing a pH-sensitive and water controlled-release drug delivery mechanism.

In addition to their thermodynamic properties, the copolymers of the present invention also exhibit pH-dependent release profiles for entrapped molecules by virtue of its added cationic moiety. The copolymers include a hydrophilic and a hydrophobic segment, which are capable of forming polymer micelles having a core derived from the hydrophobic parts and a shell from the hydrophilic part. The polymer micelles, in turn, are capable of carrying hydrophobic drugs and negatively chargeable compounds, such as nucleic acids, anionic proteins and other anionic pharmaceuticals. As a result, the present copolymers may find several applications in drug delivery and protein separation, as well as use as gene vectors in gene transfer applications.

The disclosed gels have also shown to possess structural properties such that they may find use as injectable structural supplements for certain medical treatments and procedures.

The present invention is more specifically explained with reference to the following non-limiting examples, which are intended to illustrate the invention and are not to be construed as to limit the scope of the invention.

EXAMPLES

Example 1

PEG-b-PDEAEM-b-PEG Triblock Copolymer

FIGS. 1–4 illustrate the reaction scheme for preparing a triblock copolymer having the following formula (I-a):

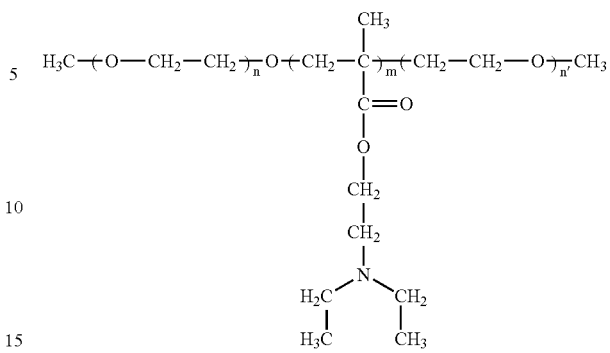

The above triblock copolymer (I-a) was prepared using N,N-(diethyl amino)ethyl methacrylate (DEAEM) (Sigma-Aldrich, St. Louis, Mo.) as the monomer, poly(ethylene glycol) methyl ether (PEGME) ($\overline{M}_n$ ~5000, Polysciences Inc., Warrington, Pa.) as the X, with a potassium salt of PEGME as the X group macroinitiator and PEGMEBr as the Y group macroterminator, and tetrahydrofuran (THF) (Sigma-Aldrich Co., St. Louis Mo.) as the solvent. The DEAEM was dried over calcium hydride and purified by distillation under reduced pressure. The PEGME was dried by heating under vacuum. The THF was dried by passing through solvent purification columns of alumina and Q5 copper/silica/alumina catalyst (columns, SolvTek, Berryville, Va.; Q5, Engelhard Corp, Iselin, N.J.). All flasks and magnetic stir bars used were either flame dried and cooled under an inert atmosphere or heated overnight at 180° C. and cooled under an inert atmosphere.

To prepare the first polymerization macroinitiator, the potassium hydride, stored under mineral oil, was first washed with THF in an inert atmosphere in a round bottom flask (enough dry THF was added to completely submerse the solid potassium hydride). PEGME was also dissolved in THF in a round bottom flask by heating the THF and PEGME to slightly above room temperature. The solvated polymer was then transferred via canulla into a flask containing the potassium hydride to form the alcoholate as illustrated in FIG. 1.

An appropriate amount of DEAEM was then added via air-free syringe or canulla to the alcoholate solution above while stirring at 400 rpm at room temperature for 20 min, followed by 50° C. for 20 minutes, resulting in the formation of a living PEGME-b-PDEAEM polymers. These living polymers were then terminated with a previously prepared macroterminator of brominated poly(ethylene glycol)methyl ether, thus providing the above triblock copolymer.

The macroterminator was previously prepared by reacting PEGME with phosphorous tribromide as illustrated in FIG. 4. The PEGME was initially dissolved in THF in a round bottom flask by heating the THF and PEGME to slightly above room temperature. The solvated polymer was then transferred via canulla into a flask containing the phosphorous tribromide while stirring, followed by 50° C. overnight, to obtain the brominated poly(ethylene glycol)methyl ether.

Figure 5:
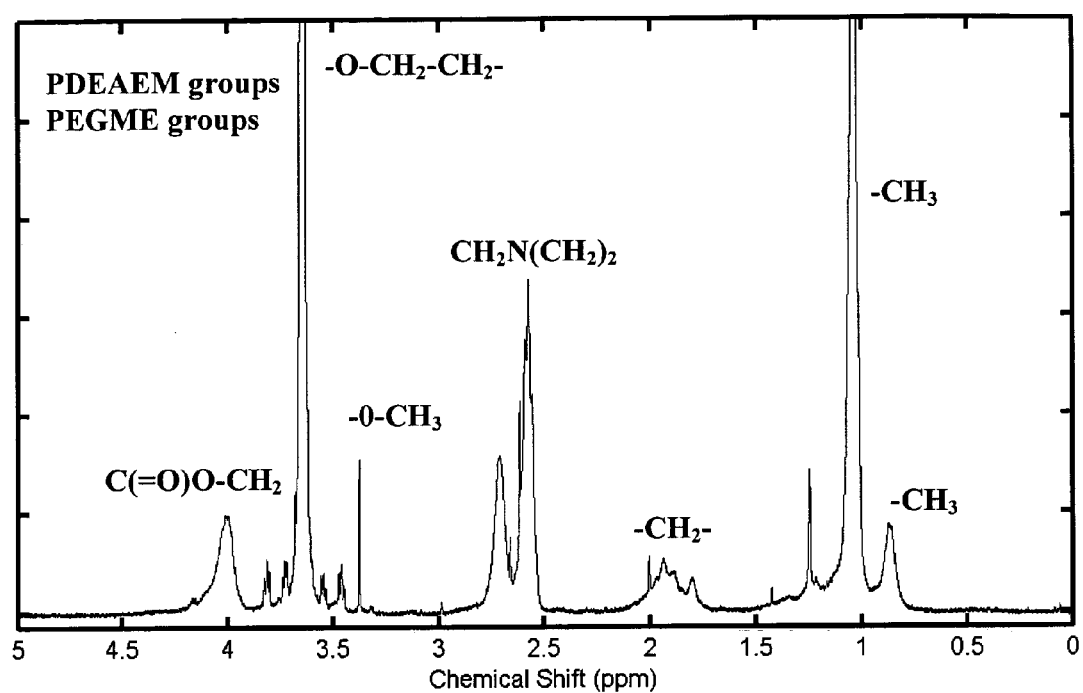
FIG. 5 is an $^1$H NMR analysis of the PEGME-b-PDEAEM-b-PEGME triblock copolymer.

The resulting triblock copolymers were precipitated in −78° C. n-hexane and dried under vacuum for at least 24 hours. The polymer was then characterized and its pH sensitivity tested. An $^1$H NMR of the triblock copolymer is set forth as FIG. 5.

Example 2

PDEAEM-b-PEO-b-PPO-b-PEO-b-PDEAEM Pentablock Copolymer

FIG. 2 illustrates the reaction scheme for preparing a pentablock copolymer having the following formula (I-b):

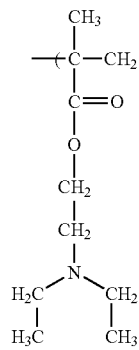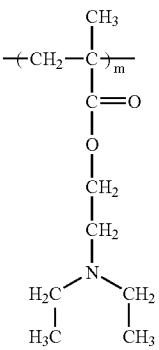

The above pentablock copolymer (I-b) was prepared using N,N-(diethyl amino) ethyl methacrylate (DEAEM) as the monomer, disubstituted potassium salt of poly(ethylene oxide)-b-poly(propylene oxide)-b-poly(ethylene oxide) (Pluronic® F127, $\overline{M}_n$, =12,600, 70% w/w PEG) (Sigma-Aldrich Co St. Louis, Mo.) as the polymerization initiator, and tetrahydrofuran (THF) as the solvent. The DEAEM and THF were dried as in Example 1 above. The Pluronic® was dried by heating under vacuum.

Figure 3:
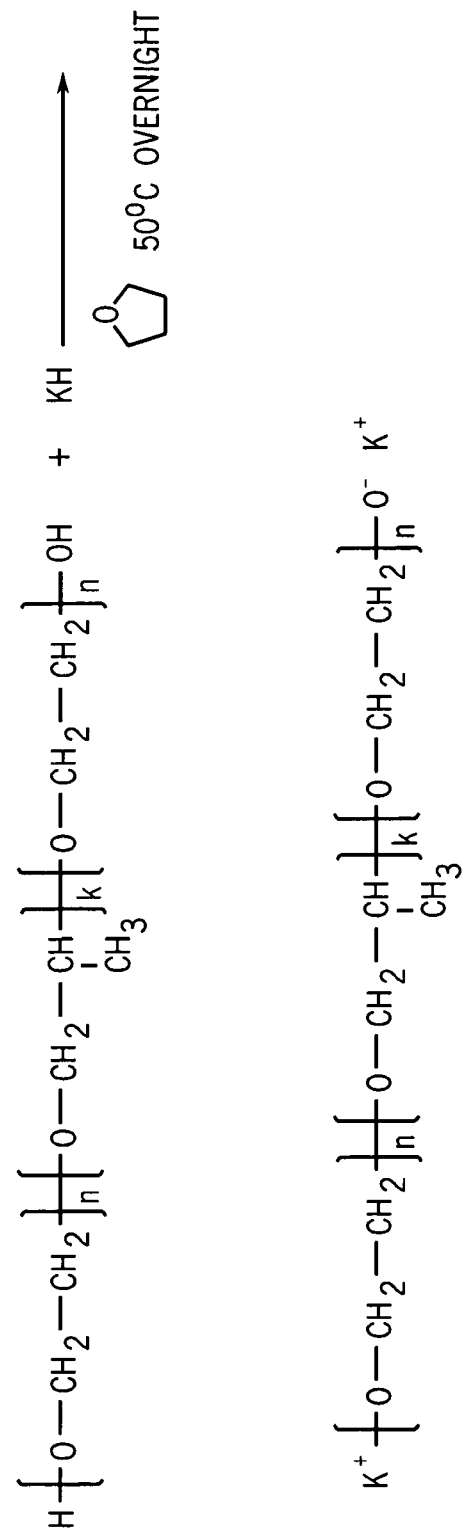
FIG. 3 is an illustration of the reaction scheme for pentablock polymerization initiator formation.

To prepare the polymerization initiator illustrated in FIG. 3, the potassium hydride, stored under mineral oil, was first washed with THF in an inert atmosphere in a round bottom flask as in Example 1. The Pluronic was then dissolved in THF in a round bottom flask by heating the THF and Pluronic to slightly above room temperature. The solvated polymer was then transferred via canulla into a flask containing the potassium hydride to form the alcoholate.

An appropriate amount of DEAEM was added via air-free syringe or canulla to the alcoholate polymerization initiator while stirring at 400 rpm at room temperature for 20 min, followed by 50° C. for 20 minutes. The living polymers were then terminated with an injection of methanol or benzyl bromide. The resulting polymers were precipitated in −78° C. n-hexane and dried under vacuum for at least 24 hours. The polymer was then characterized and its pH sensitivity tested.

Example 3

Characterization and pH Sensitivity Testing of the Pentablock Copolymers

Nuclear Magnetic Resonance and Gel Permeation Chromatography

The pentablock copolymers from Example 2 above were tested to measure their pH sensitivity and to determine their physical characteristics. NMR data was collected on Varian VXR400 (400 MHz) and Varian VXR300 (300 MHz) spectrometers. Chloroform-d was used as the solvent for most samples. For samples in which phenyl protons were used as a functionality marker, acetone-$d_6$ was used to avoid peak overlap.

Differential scanning calorimetry (DSC) was used to evaluate two thermodynamic properties of the pentablock materials. First, the onset of the micellization temperature, $T_m$, was determined as reported by Anderson et al. *J. Pharm. Sci.*, 91:180 (2002). Second, the endothermic enthalpy (∆H) of the micellization phase transition was measured by integrating the micellization peak.

All the samples prepared showed PDI values similar to the polymerization initiators used, indicating very little added polydispersity due to the PDEAEM blocks (Table 1). The apparent slight decrease in PDI from the polymerization initiator (sample H) to the block copolymers was assumed to be due to a higher reactivity of the lower molecular weight initiators relative to the higher molecular weight initiators, as well as the bimodal nature of the Pluronic® copolymer. For Pluronic® F127, the lower molecular weight mode was on the order of $\overline{M}_p$=6000 g/mol, whereas the upper mode had an $\overline{M}_p$ of approximately 14,000 g/mol. The distance between the modes appeared to get smaller as DEAEM was added to the polymers, resulting in a slightly lower PDI. As appears to be the case in other studies with PDEAEM, GPC was not always an accurate measure of $\overline{M}_n$ or $\overline{M}_w$, most likely due to the binding of the DEAEM moiety with the column packing and the high molecular weight of the DEAEM pendent groups.

TABLE 1

Sample polymerizations of F127-initiated pentablock copolymers.

| Sample ID | Initiator | Target $\overline{M}_n$ | $\overline{M}_n$ (NMR) | PDI (GPC) | DEAEM % |
|---|---|---|---|---|---|
| A | F127 | 19810 | 19730 | 1.20 | 36.2% |
| B | F127 | 16930 | 15670 | 1.19 | 19.6% |
| C | F127 | 15600 | 13890 | 1.19 | 9.3% |
| D | F127 | 14530 | 13330 | 1.18 | 5.4% |
| E | F127 | 13930 | 12840 | 1.20 | 1.9% |
| H | F127 | — | 12600 | 1.23 | 0% |

Figure 6:
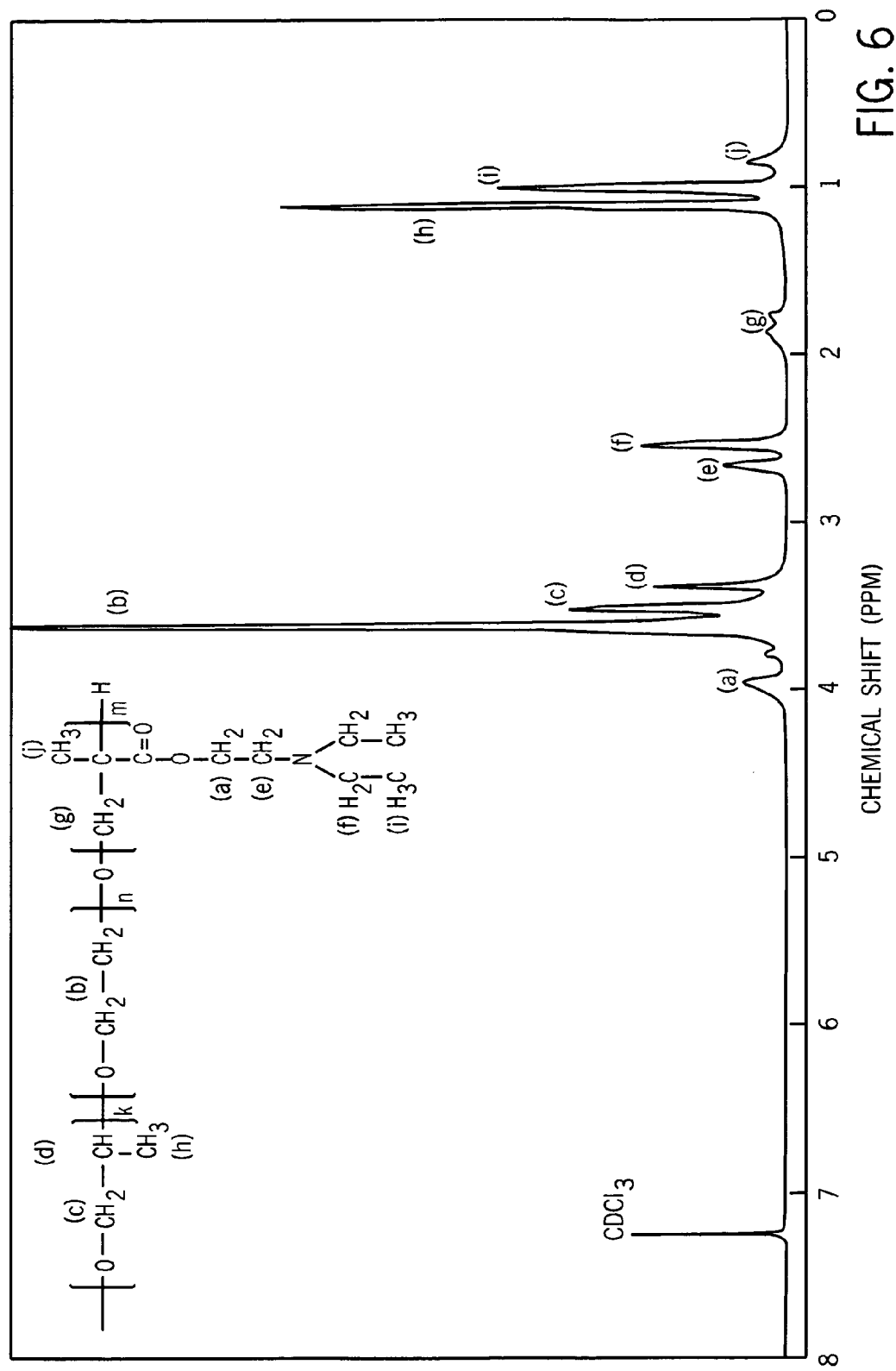
FIG. 6 is an $^1$H NMR analysis of the PDEAEM-b-PEO-b-PPO-b-PEO-b-PDEAEM pentablock copolymer.

A sample NMR of a pentablock material with peak assignments is given as FIG. 6 (integration of peaks (a), (b), (c), (d), (e) and (f) were used in $\overline{M}_n$ calculations). The $\overline{M}_n$ values for the DEAEM blocks can cover a wide range, however our release studies focused on a specific range of molecular weight. Simple dissolution and gelation tests indicated the pentablock material A (Table 1) appeared to be in a molecular weight range and DEAEM/initiator ratio that produced interesting pH-sensitive behavior while maintaining the desirable properties of F127. As a result, material A was used for the bulk of the release studies. It should be recognized, however, that materials with customized DEAEM block lengths and mass fractions can easily be prepared by the addition of slightly more or less of the cationic moiety.

Gel Permeation Chromatography

Target molecular weights, estimated actual molecular weights, PDI and percent DEAEM of the Example 2 pentablock copolymers are set forth in Table 1 below. The relative amount of PDEAEM is reported as percent mass of the methacrylate blocks relative to the total weight of the copolymer. NMR values were used for $\overline{M}_n$, and the PDI was approximated from GPC.

Gel Permeation Chromatography (GPC) was used to obtain the polydispersity index of the pentablock copolymer. THF was used as the mobile phase with a sample injection volume of 100 μl. The system was equipped with three PLgel columns (Polymer Laboratories, Amherst, Mass.) heated to 40° C. An Optilab inline refractive index detector (Wyatt Corp, Santa Barbara, Calif.) was used as the detector for retention times of the synthesized polymers relative to poly(methyl methacrylate) and polystyrene standards.

Differential scanning calorimetry was performed on the pentablock copolymer using a DSC7 (Perkin Elmer, Shelton, Conn.) to measure the critical micellization temperature. Samples were cooled to −10° C. and held at this temperature for 15 minutes before beginning a temperature scan from −10° C. to 35° C. at a rate of 5° C./min under a nitrogen purge. The critical micellization temperature was determined as the onset of the deviation of the endothermic micellization transition peak from the baseline.

Values for ΔH, $T_m$ and ΔS are given for 28% w/w aqueous samples over a wide range of PDEAEM block lengths in Table 2. Samples at lower polymer concentrations are also reported for the 36.2% DEAEM pentablock copolymer and the Pluronic® triblock copolymer. Samples denoted by a "*" contained 2.8% NBCl dye and 25.2% polymer. Numbers in parentheses are the sample standard errors for the measurements.

between these samples, as seen in a t-test for different means, are statistically significant to a p<0.01 level for both $T_m$ and ΔH.

The reason for the ΔH depression is an apparent reduction in the entropic driving force for micellization. The PPO core of the micelles is the influential factor for micellization. It is assumed that the PDEAEM portions of the pentablock material partitioned into the hydrophobic micelle core due to the fact PDEAEM is quite hydrophobic and would at least be partially solvated by the PPO nanophase. This would lead to a reduction in entropic advantage to micellization, and thus the observed change in enthalpy and entropy of micellization. In addition, limited hydrogen bonding with the methacrylate at temperatures below the CMT may have partially disrupted the hydrophobic effect, the entropic driving force for micellization. The depression in $T_m$ with increasing PDEAEM block length was most likely due to an increase in the amount of hydrophobic characteristic of the polymer. It was observed that more monomeric units of hydrophobic species, the lower the micellization temperature.

For pentablock materials terminated with benzyl bromide, the phenyl peaks were integrated relative to the known PEG Pluronic® peaks at ~3.7 ppm to determine the average number of benzyl termini per molecule. The terminal signals integrated against the PEG peak divided by the number of equivalent PEG protons in the initiator showed a ratio of 10:1, or two benzyl groups per Pluronic® initiator molecule. This indicated that according to the procedure, we were able to prepare materials that were fully pentablock in nature. Whether the block lengths were identical could not be verified, however the benzyl termination procedure allowed some insight into the material's molecular structure.

Release and pH-Sensitivity

Release studies were performed using the pentablock copolymer to determine its effectiveness in drug delivery. Nile blue chloride dye (NBCl) Nile blue chloride (NBCl)

TABLE 2

Thermodynamic properties of polymer gels obtained from pentablock materials.

| Sample ID | % Polymer | % DEAEM | $T_m$ (° C.) | ΔH (J/g) | ΔS (J/gK) |
|---|---|---|---|---|---|
| B | 28% | 19.6% | −0.73 (4.19) | 4.38 (0.79) | 16.1 (3.16) |
| C | 28% | 9.3% | 0.18 (0.64) | 5.55 (0.38) | 20.3 (1.38) |
| D | 28% | 5.4% | 1.90 (0.65) | 5.17 (0.17) | 19.3 (0.57) |
| E | 28% | 1.9% | 2.12 (1.00) | 5.32 (0.79) | 18.8 (0.27) |
| H | 28% | 0% | 2.61 (0.10) | 6.01 (0.19) | 21.8 (0.69) |
| A | 27% | 36.2% | 1.92 (2.15) | 3.56 (0.30) | 13.0 (1.19) |
| H* | 25.2% | 0% | 9.00 (0.28) | 5.28 (0.52) | 18.7 (1.83) |
| A* | 25.2% | 36.2% | 7.83 (0.36) | 3.35 (0.68) | 11.9 (2.43) |

The trend seen in the data presented in Table 2 indicates that the addition of the PDEAEM blocks slightly depresses $T_m$ and reduces the magnitude of the endothermic ΔH. The magnitude of this depression is not great for the smaller PDEAEM block lengths, namely 10% and less, however the magnitude increases for the larger PDEAEM block lengths. Although the trend is clear, a Tukey multiple comparison test (α=0.05) indicated that only the extreme samples, 0%–36.2% and 0%–20%, were statistically significant for ΔH and ΔS. For $T_m$, all samples were statistically the same at a 0.05 level due to the large variance in measured values. However, the values for samples H* and A* are a good example of the $T_m$ and ΔH depression. The differences (Sigma-Aldrich) with a visible absorbance maximum at 636 nm, MW=375.0) was used as the model drug due to its moderate water solubility, and molecular weight of 375.0 g/mol, and because it made a suitable model drug for many small molecules that do not partition exclusively into lipophilic or aqueous phases. The absorbance maxima of NBCl in the visible spectra at 636 nm also made release rates easy to measure without interference from the dissolved polymer.

Dissolution of the pentablock copolymer samples was tested using a 10:1 polymer to dye solution prepared in ethanol. The ethanol was evaporated leaving a homogeneous polymer/dye solid. Cold aqueous solutions were then prepared from this material using the method described by Anderson, et al., *Journal of Controlled Release*, 70:157

(2001). The samples were then placed in appropriate containers, typically glass dishes with a radius of 14 mm and height of 10 mm, and placed in a 37° C. oven, where they formed non-crosslinked hydrogels.

Figure 7:
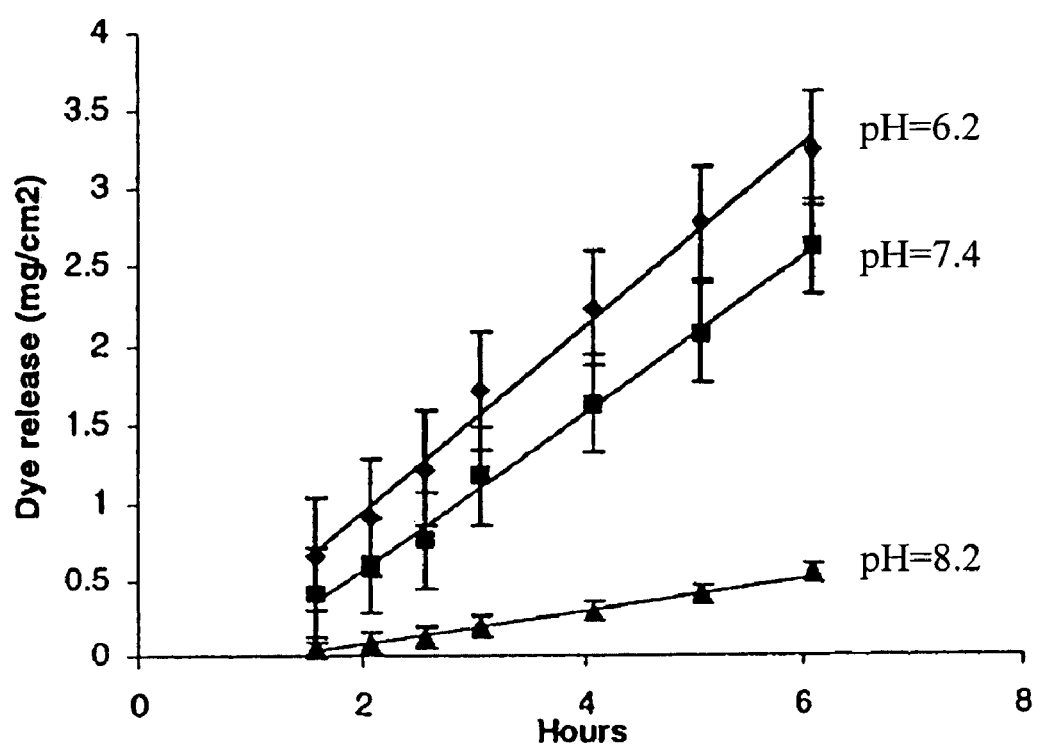
FIG. 7 illustrates the release of Nile blue chloride from PDEAEM-b-PEO-b-PPO-b-PEO-b-PDEAEM pentablock copolymer gels, sample A, at a pH of 6.2 (♦), 7.4 (■), and 8.2 (▲).

The tablet dissolution studies of the pentablock materials revealed a pH sensitivity in 28% w/w pentablock copolymer gels. Once the material set into a non-crosslinked gel, the release of molecules was dependent on the pH of the buffer (FIG. 7). As described in previous work for Pluronic® systems, protons were carried into the interfacial area of the gel as water penetrated the gel. Typically when crosslinked membranes containing PDEAEM become protonated, they swell due to electrostatic interactions of the charged cations. The same is true in the non-crosslinked case, however swelling leads to dissolution of the gel and release of the entrapped molecules.

The hydrogel samples were tested for pH sensitivity in a stirred dissolution tank at 37° C. with 800 ml of buffer solution (prepared by adding sodium phosphate to an appropriate amount of anhydrous monobasic sodium phosphate ($NaH_2PO_4$) and anhydrous dibasic sodium phosphate ($Na_2HPO_4$) to deionized water; 0.5M total ionic strength), and allowed to dissolve over a period of time. The samples were removed from the dissolution tanks at various intervals and tested for dye concentration using visible wavelength spectrophotometry. The agitation rate used was 60 RPM with a 10:1 F127:NBCl solution as a control. Release from Pluronic® gels served as a control. Poly(ethylene glycol) with $\overline{M}_n$ values of 5000 g/mol and 8000 g/mol were used as non-ionic controls and were used as received from Sigma-Aldrich (St. Louis, Mo.).

Figure 8:
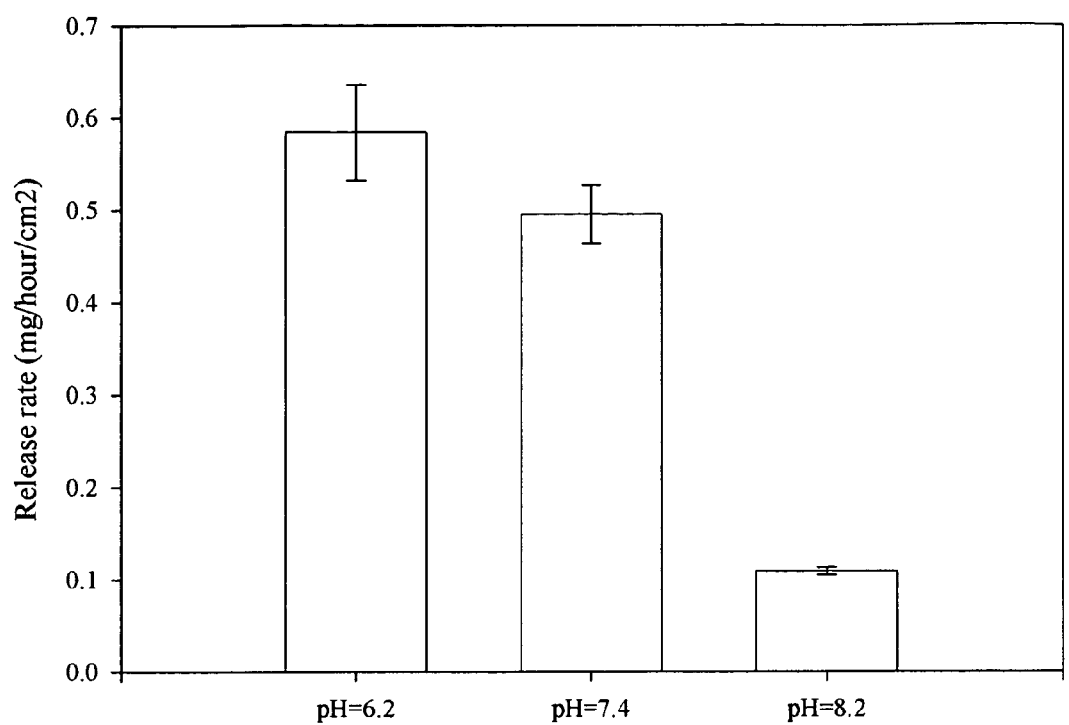
FIG. 8 illustrates the release rate of Nile blue chloride from PDEAEM-b-PEO-b-PPO-b-PEO-b-PDEAEM pentablock copolymer gels, sample A, as a function of pH.

At the higher pH values, the gel was relatively insoluble. In lower pH buffers, the gel was soluble with a rate of dye release more than five times the rate at higher pH values (FIG. 8). The release rates were computed from the slope of the release plots in FIG. 8. Again the non-ionic control material, the Pluronic®, proved to be pH-insensitive in its release profile, and had a release rate similar to the pentablock copolymer at low pH values. The release from Pluronic® F127 gels occurred at a rate of 0.57 mg/cm²/hour for a loading of 30 mg/cm³. A lack-of-fit test for this data indicated a p-value of 0.54 from an F-statistic value of 0.898.

Cytotoxicity Testing

Elution tests were performed on one sample of the pentablock material to assess the cytotoxic properties of the pentablock copolymers. Approximately 30 mg of the polymers to be tested were dissolved in 100 ml of low-glucose Dulbecco's modified eagle medium (DMEM, Sigma) with 10% fetal bovine serum (FBS, Sigma), 10 µg/ml insulin (Sigma), 10 units/ml penicillin/streptomycin (Sigma), and 100 µg/ml L-ascorbic acid (Sigma). This solution was diluted to achieve the desired polymer concentration for all tests.

NIH/3T3 mouse fibroblasts were grown in polystyrene flasks until reaching confluence at 150 cells/mm. The growth media was removed from the flasks and replaced with one of the following: DMEM (negative control), DMEM with phenol (positive control), DMEM with the pentablock material. The concentrations of the pentablock material and phenol were 3 mg/L, 0.3 mg/L and 0.03 mg/L.

After 24 hours of incubation in a humidified incubator with 5% $CO_2$ at 37° C. the samples were removed and the media was replaced with Kamovsky's fixative (2.5% glutaraldehyde, 2.0% paraformaldehyde, 0.1M sodium cacodylate) for 12 hours. The samples were then stained with a 20% crystal violet dye (CVD) solution in ethanol for 6 hours followed by dehydration with ethanol. The cell layer was then inspected for a cytotoxic response by noting changes in cell density, morphology and adherence relative to the positive and negative control samples.

Figure 9:
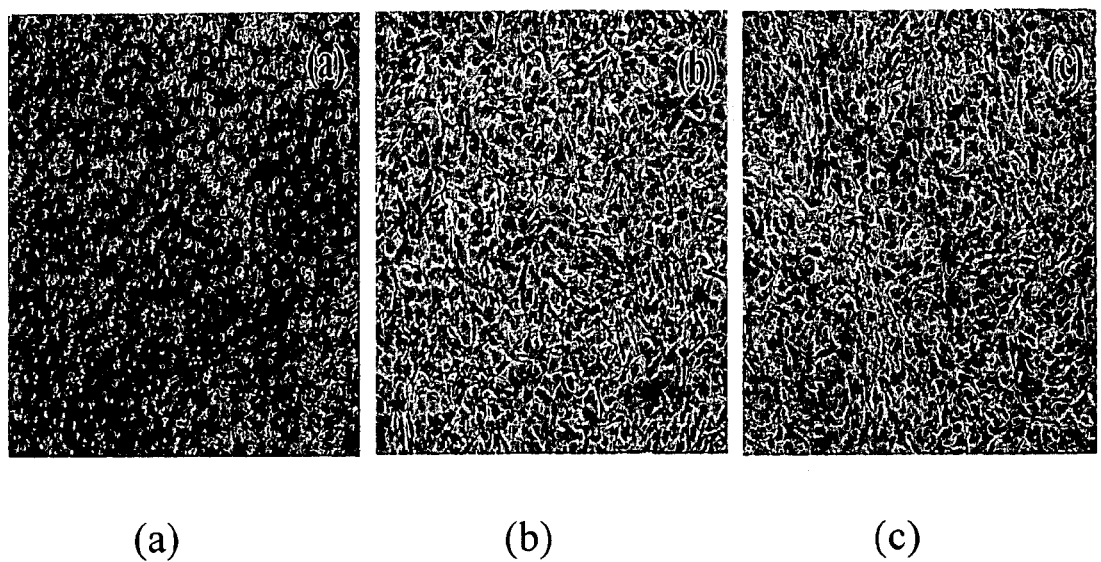
FIG. 9 illustrates the cytotoxicity of (a) positive control, phenol, (b) negative control growth media, (c) PDEAEM-b-PEO-b-PPO-b-PEO-b-PDEAEM, 32% w/w PDEAEM.

The results of the tests were compared to a negative control and a positive control. The negative control (FIG. 9a), pure growth media, was taken as the result expected for a non-cytotoxic material. The positive control (FIG. 9b), phenol laced media, was taken as the result expected for a cytotoxic material. The pentablock material (FIG. 9c), at the same concentration as the phenol positive control, led to results similar to the negative control. The fibroblast cells used in the tests showed good adhesion to the polystyrene cell culture substrate and the cells remained confluent after the 24 hour test period, neither of which is true for the positive control.

We claim:

1. A copolymer capable of thermoreversible gelation, the copolymer comprising a compound represented by the following formula (I):

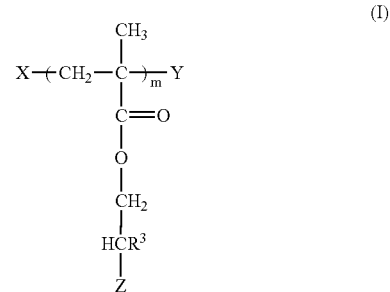

wherein m is an integer in the range of 1 to 5000, X is

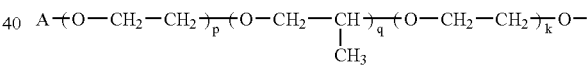

wherein p is an integer in the range of 30 to 20,000, q is an integer in the range of 1 to 20,000, and k is an integer in the range of 0 to 20,000, and A is

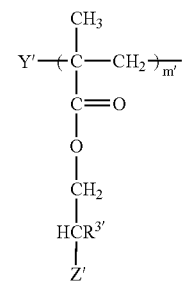

wherein m' is an integer in the range of 0 to 5,000;
Y and Y' are selected from the group consisting of X,

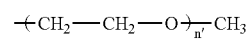

wherein n' is in the range of 30 to 20,000, and a terminator group;
$R^3$ and $R^{3'}$ are selected from the group consisting of a hydrogen and a $C_{1-6}$ alkyl group; and
Z and Z' are selected from the group consisting of $NR^6R^7$, $P(OR^8)_3$, $SR^9$, SH,

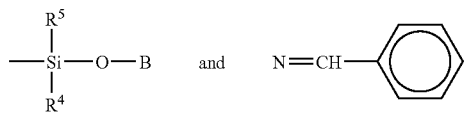

wherein $R^6$, $R^7$, and $R^8$ are the same or different $C_{1-6}$ alkyl groups, $R^9$ is a tri($C_{1-6}$ alkyl) silyl group, and B is a $C_{1-6}$ alkyl group.

2. The copolymer of claim 1 wherein k is 0.
3. The copolymer of claim 1 wherein k is a positive integer.
4. The copolymer of claim 1 wherein m' is 0.
5. The copolymer of claim 4 wherein Y' is a hydrogen.
6. The copolymer of claim 1 wherein $R^3$ is a hydrogen.
7. The copolymer of claim 1 wherein Y' is a terminator group.
8. The copolymer of claim 7 wherein the terminator group is selected from the group consisting of a benzene, an alkyl group, a carboxylic group, COOH, O—$CH_2$—Ph, $CH_3$, and a hydrogen.
9. The copolymer of claim 1 wherein Z' is $NR^6R^7$ and $R^6$ and $R^7$ are the same $C_{1-6}$ alkyl group.
10. The copolymer of claim 1 wherein Z' and Z are the same.
11. The copolymer of claim 1 wherein Y and Y' are the same.
12. The copolymer of claim 11 wherein Y is a terminator group.
13. The copolymer of claim 12 wherein the terminator group is selected from the group consisting of a benzene, an alkyl group, a carboxylic group, COOH, O—$CH_2$—Ph, $CH_3$, and a hydrogen.
14. The copolymer of claim 1 wherein Y in formula (I) is

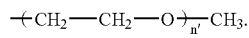

15. The copolymer of claim 14 wherein $R^3$ is a hydrogen.
16. The copolymer of claim 14 wherein Z is $NR^6R^7$ and $R^6$ and $R^7$ are the same $C_{1-6}$ alkyl group.
17. The copolymer of claim 1 wherein the copolymer is

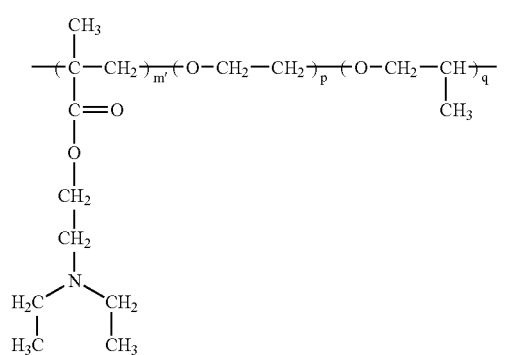

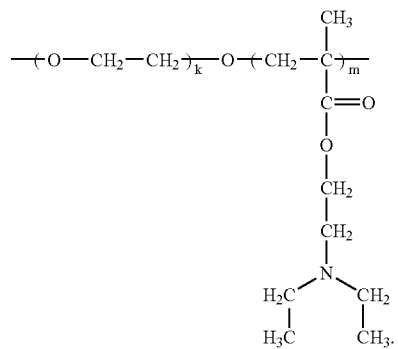

18. The copolymer of claim 17 wherein k is 0.
19. The copolymer of claim 17 wherein k is a positive integer.
20. The copolymer of claim 17 wherein m' is 0.
21. A polymer micelle composition comprising the copolymer of claim 1.
22. The polymer micelle composition of claim 21 wherein the copolymer is

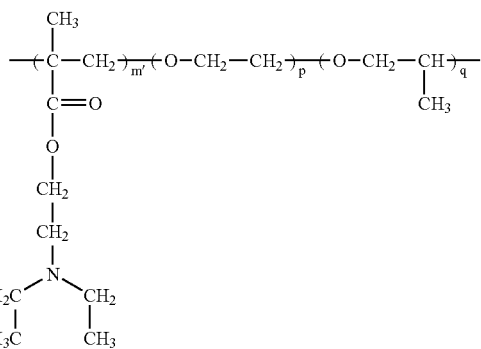

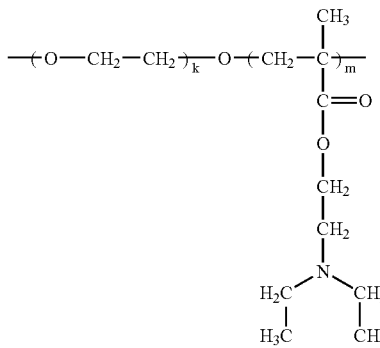

wherein p, q, k, m and m' are as defined in claim 1.

23. The polymer micelle composition of claim 22 wherein k is 0.
24. The polymer micelle composition of claim 22 wherein k is a positive integer.
25. The polymer micelle composition of claim 22 wherein m' is 0.
26. A pharmaceutical comprising the copolymer of claim 1.

27. The pharmaceutical of claim 26 wherein the copolymer is
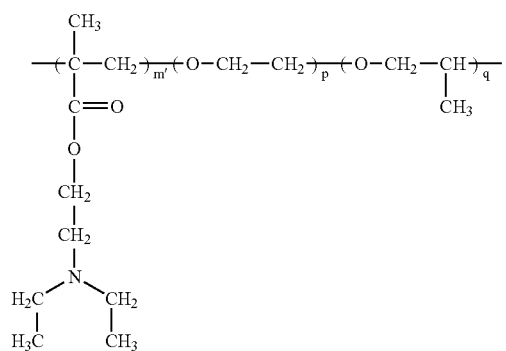
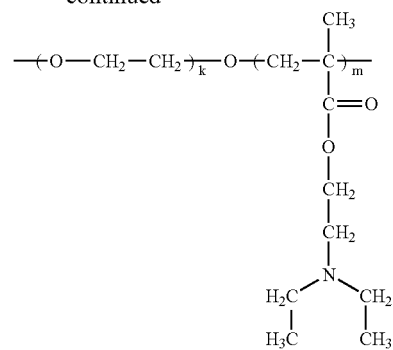
wherein p, q, k, m and m' are as defined in claim 1.
28. The pharmaceutical of claim 27 wherein k is 0.
29. The pharmaceutical of claim 27 wherein k is a positive integer.
30. The pharmaceutical of claim 27 wherein m' is 0.
* * * * *